Dec. 6, 1966    J. B. WREN ETAL    3,290,526
INDUCTION MOTOR ROTOR
Filed Aug. 5, 1963

WITNESSES
Theodore F. Wrobel
Edward F. Possessky

INVENTOR
James W. York
and John B. Wren
BY
ATTORNEY

United States Patent Office 3,290,526
Patented Dec. 6, 1966

3,290,526
INDUCTION MOTOR ROTOR
John B. Wren, Amherst Township, Erie County, and James W. York, Clarence Township, Erie County, N.Y., assignors to Westinghouse Electric Corporation, Pittsburgh, Pa., a corporation of Pennsylvania
Filed Aug. 5, 1963, Ser. No. 300,000
5 Claims. (Cl. 310—211)

The present invention relates to induction motors, and more particularly to squirrel cage rotors employed in such motors.

In a number of heavy duty applications, the duty cycle which an induction motor undergoes leads to severe thermal cycling and temperature rise in the squirrel cage structure of the rotor. Although the motor is otherwise acceptably rated in terms of torque and power, such extreme heating conditions can cause the conductive cage bars to melt if formed from a material such as aluminum, or to fail structurally under centrifugal forces or thermal cycling stresses if formed from a material (such as an alloy of copper) which is susceptible to substantial weakening at relatively elevated temperatures. Such cage bar materials are thus unsuitable for the kind of motor applications described even though they possess other necessary or advantageous operating properties such as low magnetic permeability and saturation and high thermal and electrical conductivity.

If there is no danger of substantially weakening nor melting the conductor bars under expected operating conditions, suitable structurization of the squirrel cage about its core assembly can provide relatively minimal adverse effect from centrifugal and thermal stresses. As an illustration of such structurization, reference is made to a copending application entitled "Induction Motor Rotor," filed by L. B. Lynn, Serial No. 266,391, filed March 19, 1963, now Patent No. 3,194,996, issued July 13, 1965, and assigned to the present assignee.

Under conditions of relatively extreme cage bar operating temperatures, however, squirrel cage structures must be provided with bars formed from a material exhibiting strength under such circumstances. For example, nickel can be used for the conductor bar material as disclosed in another copending application entitled "Induction Motor Rotor," filed by W. M. Trigg on August 5, 1963, Serial No. 299,999, and also assigned to the present assignee.

Carrying this analysis one step further, there are many applications where added structural support means or members are ineffectual in cage bar strengthening, and where a cage bar material (such as nickel) which is suitable from a strengthening standpoint introduces excessive machine reactance. More specifically, there are some cases where minimum torque requirements under all operating conditions and expected operating temperature disqualify both of the foregoing approaches to the cage bar structurization problem, since the former approach does not employ a material suitable for the expected cage bar operating temperatures and since the latter approach fails to provide the required machine torque under at least some conditions by virtue of the increased reactance which the cage bar material introduces.

In accordance with the broad principles of the present invention, a squirrel cage rotor for an induction motor comprises an elongated core assembly having longitudinal slots disposed about the outer periphery thereof and having respective conductive bars or bar combinations disposed and suitably supported in the slots. The bar combinations are interconnected by means of end rings and each of the bar combinations, or at least some of the bar combinations, is formed with parallel conduction paths respectively of a material comprising nickel and another material of relatively lower magnetic permeability than that of the first mentioned material, so as to characterize the cage structure with high strength at relatively high operating temperatures. The cage structure further results in a lower machine reactance than would be the case if a material comprising nickel where employed alone as a cage bar material. Otherwise, the cage structure generally has structural, electrical, thermal and magnetic properties suitably balanced for efficient motor operation.

It is therefore an object of the present invention to provide a novel squirrel cage rotor for an induction motor so as to adapt the motor for heavy duty usage.

Another object of the invention is to provide a novel squirrel cage rotor for an induction motor adapted for heavy duty usage wherein the cage bars or individual cage bar combinations are each formed from parallel current paths of differing materials so as to characterize the rotor cage with high temperature structural strength while motor reactance is maintained at a relative minimal value.

A further object of the invention is to provide a novel squirrel cage rotor for an induction motor adapted for heavy duty usage wherein the cage bars or individual cage bar combinations are each formed with parallel current paths respectively of a material comprising nickel and another alloy material of nickel so as to characterize the rotor cage with high temperature structural strength while motor reactance is maintained at a relative minimal value and further to characterize the motor with improved torque characteristics under conditions of stall or near-stall as a result of decreasing magnetic permeability and leakage reactance of the nickel over a relatively elevated bar material operating temperature range.

These and other objects of the invention will become more apparent upon consideration of the following detailed description along with the attached drawings, in which.

Figure 1:
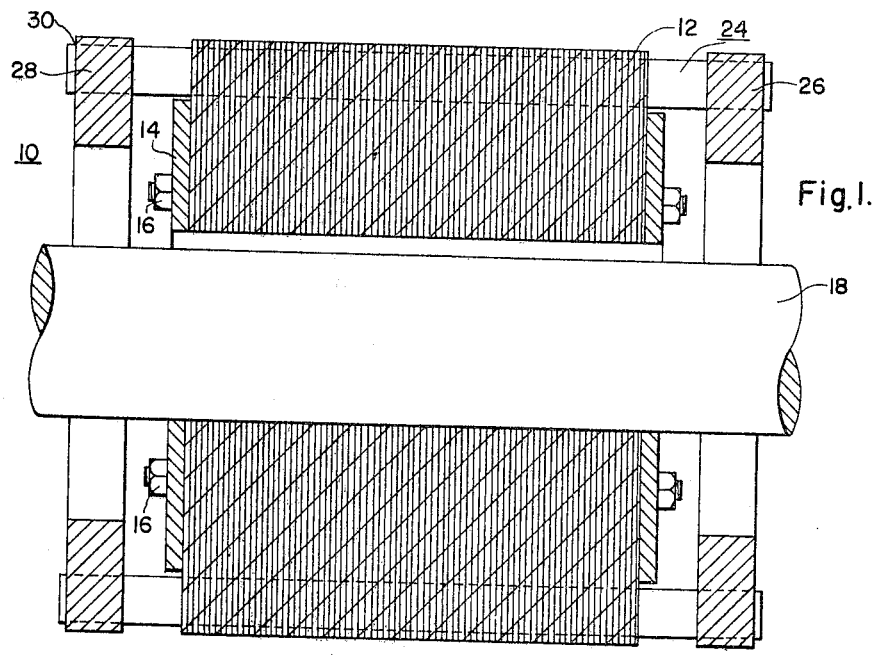
FIGURE 1 shows a longitudinal section of a rotor for an induction motor constructed in accordance with the principles of the invention.
Figure 2:
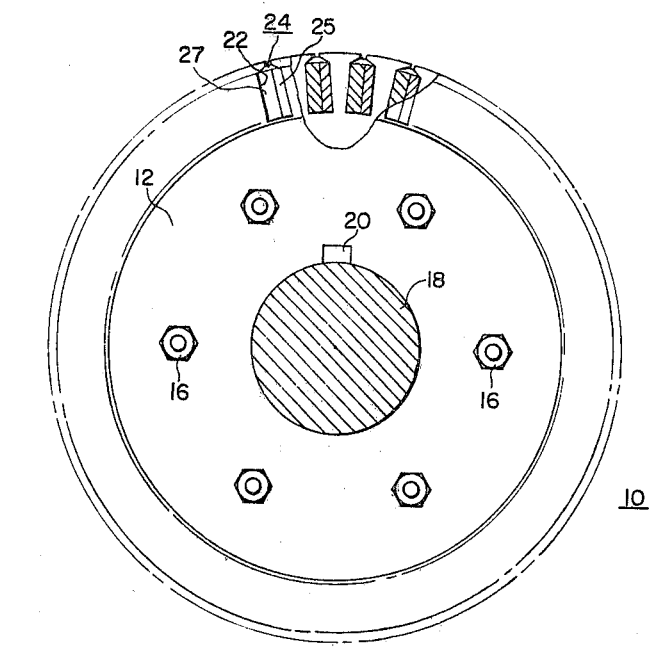
FIG. 2 shows an end view of the rotor of FIG. 1 with a portion thereof broken away.
Figure 3:
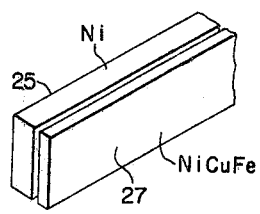
FIG. 3 shows a perspective view of a cage bar combination employed in the rotor of FIG. 1.

There is shown in FIGS. 1 and 2, a rotor 10 which serves as the rotating element of an induction motor. The rotor 10 includes a core assembly 12 which is generally cylindrical in form and preferably laminated so as to minimize eddy current and hysteresis losses. The individual core laminae (not shown) are stacked one against the other with suitable insulation (not shown) therebetween and held together to form the core assembly 12 by means of end plates 14 and bolts 16 or other suitable securing means.

A drive shaft 18 is provided with suitable bearing support relative to the motor frame or other support member (not shown). In turn, the drive shaft 18 provides support for the rotor 10 and for this purpose can be keyed as indicated by the reference character 20 into engagement with the rotor core assembly 12.

There are spaced about the outer lateral or generally circular periphery of the rotor core assembly 12 a plurality of slots 22 which extend along the length of the core assembly 12 and which are provided for the placement of respective cage bars or cage bar combinations 24. For the purpose of this disclosure and description, the term "cage bar combination" is meant to refer to electrical conductor means having parallel current paths of differing materials and the respective current paths can be provided in separate parallel portions respectively formed from the differing materials or in parallel portions which are suitably integrated into a solid unit and which are nonetheless respectively formed from the differing materials.

The cross-section of the conductor slots 22 and the bar combinations 24 in terms of size and shape is determined on the basis of electrical design needs. The number of bar combinations 24 disposed about the lateral periphery of the core assembly 12 is similarly determined.

Resistance rings 26 and 28 are secured to the ends of the cage bar combinations 24 and are spaced from the respective ends of the rotor core assembly 12. The resistance rings 26 and 28 thus provide a path for current circulation in response to electromotive force generated in the bar combinations 24 under the influence of the motor field magnetic flux. Carbon or stainless steel can be employed as the ring material, but any material which provides suitable running rotor resistance can be used. If desired each end portion of each bar combination 24 can be disposed in a mating slot 30 provided about the periphery of each ring 26 or 28. When the bar combinations 24 and the rings 26 and 28 are secured together, as by welding, the usual squirrel cage structural form is provided.

Since cage bars of an induction motor rotor serve as current conductors, the material from which they are formed should have relatively high electrical conductivity particularly as related to the electrical steel normally used to form the aforementioned rotor core assembly laminae. In addition, such material should preferably have relatively high thermal conductivity so as to avoid the build up of excessive temperature gradients and accompanying thermal stresses therein.

As another needed characteristic, expansivity of the material as a result of heating should preferably be relatively low so as to match that of the rotor core laminae material (electrical steel). To facilitate structurization of the squirrel cage, the material should preferably also be characterized with good weldability. Further, the magnetic permeability and saturation of the cage bar material should be low enough to prevent inefficient motor operation otherwise associated with excessive slot leakage.

Even if all the foregoing properties are suitably provided in a cage bar material, the strength of usual materials is inadequate at relatively high cage bar operating temperatures encountered in heavy duty applications. Under such conditions, as already pointed out, the material of the cage bars either melts, as in the case of aluminum, or fails structurally under centrifugal forces or thermal cycling stresses, as in the case of copper or certain copper alloys such as brass.

Moreover, the use of a cage bar material which does have high temperature strength and good electrical conductivity can still have shortcomings in some applications or under some conditions of use by reason of its relatively greater magnetic permeability and resulting inadequacies in terms of motor torque. Such shortcomings can result, for example, under some conditions of use of a motor in which the squirrel cage bars are formed from nickel. On the other hand, there are high temperature strengthening advantages in the use of nickel as a cage bar material as more fully described in the aforementioned copending application of W. M. Trigg.

In accordance with the present conceptualization, each or at least some of the conductor cage means or the cage bar combinations 24 (this terminology was previously defined) are provided with parallel current paths formed from different materials. In this manner, the advantageous properties of the individual materials can be accumulated while the disadvantageous properties of each are counter-balanced by corresponding advantageous properties of the other so as to provide a property system (having some degree of variability) for the cage bar combinations 24 more favorable than could otherwise be obtained. Hence, in this embodiment of the invention, each cage bar combination 24 is provided with parallel bar portions 25 and 27 which are placed in parallel and longitudinally and radially coextending relation in the associated slot 22.

A material substantially comprising nickel, or an alloy of this element which is equivalently propertied at least in terms of magnetic permeability and saturation, melting temperature and electrical conductivity, is used to form the bar portion 25 so as to provide the bar combination 24 with high temperature strength (melting point of nickel is 1452° C.) and with relatively high electrical conductivity as compared to that of electrical steel. For the purpose of comparison, it is noted that copper melts at 1083° C. and aluminum melts at 660° C.

On the other hand, nickel is usually classified as being ferromagnetic and singular use of this material in forming the bars of an induction motor squirrel cage can result in excessive motor reactance and inadequate motor torque under some conditions of use. Therefore, the bar portion 27 is formed from a material having a magnetic permeability lower than that of nickel and it thus provides greater slot reluctance and lower machine reactance than would be the case if nickel alone were employed as a bar material. The material used to form the bar portion 27 also preferably has relatively greater high temperature strength than the usual cage bar materials but it need not be as great as that of nickel. In other respects, the material of the bar portion 27 can have an electrical conductivity less than that of nickel but preferably greater than that of electrical steel and further is preferably readily weldable.

In this example, a nickel base alloy having copper and iron constituents is employed as the material of the bar portion 27. This material is sold under the tradename "Monel" and comprises by weight 67% nickel, 30% copper and 1.5% iron. This alloy is essentially non-magnetic over the designed temperature range of motor operation and has a suitable melting point for cage strengthening purposes. Although its electrical conductivity is somewhat less advantageous, the more conductive parallel nickel bar portion 25 counterbalances this property of Monel.

The nickel bar portions 25 have good thermal conductivity and relatively low thermal expansivity approaching a close match to that of electrical steel. Although the Monel bar portions 27 have lower thermal conductivity and higher thermal expansivity, these properties do not lead to structural strength problems in the squirrel cage.

As a further operating feature of the rotor 10, it is noted that, over the higher range of temperatures in which nickel is in the solid state, the magnetic permeability of nickel, and, as a consequence, machine reactance, decreases with increasing temperature. Accordingly, as a heavy duty motor in which the rotor 10 is used, approaches a stalled condition, increasing rotor temperature produces decreasing machine reactance and better torque than that produced under ordinary circumstances for the resumption of normal motor operation. The usual decrease in torque on stall resulting from increasing stator resistance with heating is thus offset or counteracted. However, this decreasing reactance effect is not as great as the case where nickel is employed alone as a cage bar material.

The bar portions 25 and 27 are proportioned in cross section to provide sufficient reluctance in the rotor slot leakage paths so that the resulting motor reactance provides the minimum torque required under all design usage conditions. Other properties of the resulting variable property system for the bar combinations 24 are similarly determined by this balancing or proportioning process.

In other applications of the invention where high temperature cage bar strength is desired, the use of nickel base alloys other than Monel in forming the bar portions 27 can provide other variable systems of bar combination properties from that variable property system obtainable with the use of Monel. Such other material, however, should be characterized on a relative basis with high temperature strength since this property is needed for heavy duty motor applications of the kind referenced above. Furthermore, the resulting variable property system for a given combination of bar portion materials need not be limited to that obtainable with a pair of bar portions of differing materials, since a greater number of parallel bar portions can be employed if design needs so warrant.

An induction motor in which the rotor 10 is employed is characterized with efficient operation. In particular, such a motor is qualified for service in many heavy duty applications where other motors equivalently rated in terms of torque and power, or equivalently rated in terms of high temperature strength, are inadequate.

The foregoing description has been set forth only to illustrate the principles of the invention. Accordingly, it is desired that the invention be not limited by the embodiment described, but, rather, that it be accorded an interpretation consistent with the scope and spirit of its broad principles.

What is claimed is:

1. A rotor member for an induction motor comprising an elongated generally cylindrical core member having a plurality of longitudinally extending slots disposed in spaced relation about the lateral periphery thereof, a conductor bar combination disposed in each of at least some of said slots, a resistance ring joined to the ends of said bar combinations adjacent each end of said core member, each of said bar combinations having longitudinally and radially coextending generally parallel portions providing parallel current paths and formed from different high temperature strength materials, at least one of said portions formed from a material comprising nickel and having a magnetic permeability as high as that of nickel and a melting point in excess of 1083° C. and having a relatively high electrical conductivity as compared to that of electrical steel, another of said portions formed from a material having a magnetic permeability lower than the first mentioned magnetic permeability and further having a melting point in excess of 1083° C.

2. A rotor member for induction motor comprising an elongated generally cylindrical core member having a plurality of longitudinally extending slots disposed in spaced relation about the lateral periphery thereof, a conductor bar combination disposed in each of at least some of said slots, a resistance ring joined to the ends of said bar combinations adjacent each end of said core member, each of said bar combinations having a pair of coextending generally parallel portions providing parallel current paths and formed from different high temperature strength materials, one of said portions formed substantially from nickel and the other portion formed from a nickel base alloy having a magnetic permeability lower than that of nickel and an electrical conductivity comparable to that of electrical steel.

3. A rotor member for an induction motor comprising an elongated generally cylindrical core member having a plurality of longitudinally extending slots disposed in spaced relation about the lateral periphery thereof, a conductor bar combination disposed in each of at least some of said slots, a resistance ring joined to the ends of said conductor bar combinations adjacent each end of said core member, each of said conductor bar combinations comprising a pair of coextending generally parallel bar portions providing parallel current paths and formed from different high temperature strength materials, one of said portions formed substantially from nickel and the other of said portions formed from a nickel base alloy comprising nickel, copper and iron and having an electrical conductivity comparable to that of electrical steel and a magnetic permeability lower than that of nickel.

4. A rotor motor for an induction motor comprising an elongated generally cylindrical core member having a plurality of longitudinally extending slots disposed in spaced relation about the lateral periphery thereof, a conductor bar combination disposed in each of at least some of said slots, a resistance ring joined to the ends of said bar combinations adjacent each end of said core member, each of said bar combinations having a pair of longitudinally and radially coextending generally parallel bar portions providing parallel current paths and formed from different high temperature strength materials, one of said bar portions formed substantially from nickel and the other bar portion formed from an alloy substantially comprising by weight 67% nickel, 30% copper and 1.5% iron.

5. A rotor member as defined in claim 2 in which said other portion of the conductor bar combinations is formed from an alloy of nickel and copper having lower electrical conductivity than that of nickel and having substantially lower magnetic permeability than that of nickel.

References Cited by the Examiner

UNITED STATES PATENTS

| 2,188,398 | 1/1940 | Bernard | 310—211 XR |
| 3,233,134 | 2/1966 | Yost | 310—201 |

FOREIGN PATENTS

| 321,731 | 6/1920 | Germany. |
| 479,225 | 2/1938 | Great Britain. |
| 594,582 | 11/1947 | Great Britain. |
| 660,854 | 2/1929 | France. |

OTHER REFERENCES

Technical Bulletin T-15, Engineering Properties of Nickel 200 and 201, copyright 1964, The International Nickel Co., Series No. TA479N515T.

MILTON O. HIRSHFIELD, *Primary Examiner.*

MAX L. LEVY, *Examiner.*

J. J. SWARTZ, *Assistant Examiner.*